United States Patent [19]

Haggerty et al.

[11] Patent Number: 4,472,448
[45] Date of Patent: Sep. 18, 1984

[54] METHOD FOR PREPARING MEAT-IN-SAUCE, MEAT-IN-GRAVY AND MEAT FILLING

[75] Inventors: John A. Haggerty, Fort Wayne, Ind.; Dennis D. Corbin, St. Louis, Mo.

[73] Assignee: Central Soya Company, Inc., Fort Wayne, Ind.

[21] Appl. No.: 455,417

[22] Filed: Jan. 3, 1983

Related U.S. Application Data

[63] Continuation-in-part of Ser. No. 200,778, Oct. 27, 1980, abandoned.

[51] Int. Cl.$^3$ .......................... A23B 4/00; A23L 1/31
[52] U.S. Cl. .................................. 426/589; 426/646; 426/656; 426/662
[58] Field of Search ............... 426/589, 641, 646, 652, 426/654, 656, 662, 608

[56] References Cited

U.S. PATENT DOCUMENTS

| | | | |
|---|---|---|---|
| 2,635,963 | 4/1953 | Glabe | 426/662 X |
| 2,881,076 | 4/1959 | Sair | 426/652 X |
| 3,268,335 | 8/1966 | Circle et al. | 426/662 X |
| 3,836,685 | 9/1974 | Schara et al. | 426/646 |
| 3,900,576 | 8/1975 | Schulz | 426/652 X |
| 4,044,168 | 8/1977 | Steenhoer et al. | 426/589 X |
| 4,140,810 | 2/1979 | Van Dam et al. | 426/589 X |
| 4,218,490 | 8/1980 | Phillips et al. | 426/654 X |

FOREIGN PATENT DOCUMENTS 2292436  11/1974  France ............................. 426/656

OTHER PUBLICATIONS

Cook, "18 Mistakes in the Use of Lecithin", Food Industries, 8-1945, pp. 94-95.

*Primary Examiner*—Arthur L. Corbin

[57] ABSTRACT

This invention is concerned with the emulsification and stabilization of fat in meat-in-sauce, meat-in-gravy and meat filling foods which are heat processed. The method includes first adding from about 0.5% to about 3.5%, by weight of the meat fat, of a refined soybean phosphatide, adding water, thereafter adding from about 2.5 to about 30% of a soybean protein or from about 2.5 to about 35% of a textured soybean protein, and thereafter cooking the resultant mixture for at least 10 minutes at 180° F.

8 Claims, No Drawings

METHOD FOR PREPARING MEAT-IN-SAUCE, MEAT-IN-GRAVY AND MEAT FILLING

This is a continuation-in-part of our copending application Ser. No. 200,778, filed Oct. 27, 1980, now abandoned.

BACKGROUND OF THE INVENTION

This invention is concerned with the emulsification and stabilization of fat in meat-in-sauce, meat-in-gravy and meat filling foods (hereinafter "meat foods") which are heat processed; and more particularly to a method resulting in a meat food having a significant diminution of fat separation after processing.

Of the meat foods which are the subject of this invention, meat-in-sauce foods include such popular foods as chili con carne in its various forms, sloppy joe, spaghetti sauce with meat, and the like. Meat-in-gravy foods are prepared from chunk meat and include popular foods such as beef stew, barbecue beef or pork with sauce, and the like. Meat filling foods include taco filling, enchilada filling and burrito filling.

Each of these meat containing food items are cooked in processing. Some are subsequently canned and heat retorted to produce shelf-stable foods. These may also be frozen in containers such as aluminum trays. Others are customarily cooked and frozen in containers before distribution through the marketing chain to the consumer. Some of these meat-containing foods may be cooked at the point of serving, such as in restaurants and institutions.

Over the years, the manufacturers of these meat foods have had to contend with the major problem resulting from the cooking or heat processing; namely, fat separation. The problem of fat separation on heat processing has a number of deleterious implications.

Fat separation after cooking of these meat foods, whether they are canned or heat retorted or frozen in aluminum trays, results in container filling problems. The hot meat-containing mix with this liquified meat fat is portioned by appropriate devices from a vessel by gravity feed to the desired container. Because of the propensity for liquid fat stratification through upward movement in the supply vessel, even with non-aerating agitation, this results in some non-uniformity in the composition of the container contents, from first filled to last filled. The canned items are then retorted to insure shelf stability. This heat stressing further aggravates the fat separation problem. A prime example is canned chili; the can, when open, has a thick layer of red congealed fat at the top of the food mass.

It is obvious that fat separation in meat foods results in diminished eye appeal because of the high visibility of the fat. Further, the separated fat results in a greasy or oily mouth feel, even when the product is warmed for serving. This is because the fat is not thoroughly redispersed in the product by heating.

Food manufacturers have tried several measures to reduce fat separation in meat-in-sauce, meat-in-gravy and meat filling foods. These measures have not been overly successful and have resulted in minimal product improvement. As one measure in controlling undesirable visible fat in meat foods, producers have skimmed liquified fat from the hot product mixture prior to canning or freezing. This is not a sound practice in that the meat food regulations of the Food Safety and Quality Service of the United States Department of Agriculture require a minimum meat content, part of which is the fat that is associated with the lean portion of the meat. Hence, skimming may result in a product which does not conform to Federal regulations.

Other measures include the use of selected additives. Fat absorbing substances such as oat flakes and flour or potato starch may be incorporated in the mix. These will do only a partial job at levels of addition which do not alter the desirable consistency as perceived by the consumer. This is also true of thickening agents such as corn and wheat starches. Levels which result in measurable reduction of fat separation cause thick consistencies which have an undesirable mushy or grainy mouth feel. Further, these levels of additives adversely influence the flavor. This led the art to try non-food additives such as the finely divided silicious or cellulosic materials as described in U.S. Pat. No. 3,836,685.

Soybean products have also been used to control fat separation in a variety of products. Crude lecithin is a well known emulsifier for water in fat in non-meat products such as margarine. Soy protein has been used in controlling fat in products such as beef patties and frankfurters with acceptable changes in the consistency of the product. For example, it has been long known (U.S. Pat. No. 2,881,076) that soy flour was a fat emulsifier for meat. Textured soy protein also has been used to absorb fat and water during normal hydration processes. Many of these soybean products have been used alone, and none of these soybean products has been thought to provide means whereby fat separation could be controlled in cooked meat foods in an acceptable manner. The art, even when dealing with gravy alone (which is subject to much less heating) went to a cheese whey derivative in U.S. Pat. No. 4,140,810, not using a soy protein even though a small amount of soybean phosphatide was employed.

SUMMARY OF THE INVENTION

Contrary to the prior art, the instant invention makes use of specified amounts of soybean phosphatide and soybean protein in a definite sequence to provide an improved method for controlling fat separation in cooked meat-in-sauce and meat-in-gravy and meat filling foods, more particularly one which does not deleteriously affect product consistency, eye appeal, mouth feel and flavor. According to the invention, stabilizing the fat in meat-in-sauce, meat-in-gravy and meat filling foods having significant amounts of meat containing meat fat and water therein comprises first adding from about one part to about ten parts by weight of refined soybean phosphatide and thereafter from about five parts to about fifty parts by weight of soybean protein products chosen from the group consisting of textured soybean protein isolates and textured soybean protein concentrates and textured defatted soybean flour or combinations of soybean protein and textured soybean protein products.

More specifically the inventive method includes first combining the meat fat in liquid form with an amount of refined soybean phosphatide ranging from 0.5% by weight to about 3.5% by weight of the meat fat and thereafter adding an amount of a soybean protein product ranging from about 2.5% to about 30% by weight of the meat fat or adding a textured soybean protein product in an amount from about 2.5% by weight to about 35% by weight of the meat fat or adding a combination of the untextured and textured products and cooking the resultant product for at least 10 minutes at 180° F.

Thus, the sequence specified does not permit use of a combined phospholipid such as that described in co-owned U.S. Pat. No. 3,268,335.

DESCRIPTION OF A SPECIFIC EMBODIMENT

Meat fat in cooked meat-in-sauce, meat-in-gravy and meat filling foods can be stabilized to a significant degree in a finely dispersed or emulsified state by the method and ingredients of the invention. The meat foods to which the method and ingredients of the invention is applicable are heat-processed products which are best defined as meat-in-sauce and meat-in-gravy and meat filling foods. These foods possess a certain degree of fluidity or flowability. Meat fat in these foods is derived primarily from the meat cuts utilized in their preparation.

These heat-processed meat foods include such items as chili con carne, with or without beans, sloppy joe, spaghetti sauce with meat and the like, meat filling for tacos, enchiladas and burritos, beef stew, barbecue beef and meat sauce, barbecue pork and meat sauce and the like.

The meat foods in question contain either ground meat or chunk meat up to about fork size. The food customarily has a fat content from about 5% to about 30% by weight or higher as processed. The moisture content of these foods will range from about 12% to about 80% by weight, reflecting the degree of fluidity or flowability customarily expected in these specific meat containing foods.

The meat cuts used in preparing these meat foods are sold and used on the basis of the lean and fat content. Thus, a manufacturer of these foods would choose meat cut with a lean/fat ratio or fat content best suited to his needs in product and target market. These lean/fat ratios may range from 12/88 to 90/10. The practice of this invention includes a recognition of the meat variability confronting the manufacture, and offers flexibility in resolving the problems resulting from such variability.

In accordance with the invention, refined soybean phosphatide and one or two soybean products are added in sequence to the meat-containing foods of the invention at appropriate levels in accordance with the method of the invention to materially reduce fat separation after heat processing of the aforementioned meat foods to produce a product of recognizable identity in consistency with enhanced eye appeal, mouth feel and taste and organoleptic qualities generally.

Materials which in accordance with the method of this invention are added to the meat foods of the invention include soybean phosphatides, soy protein isolate or soy protein concentrate, and textured defatted soy flour and textured soy protein concentrate and textured soy protein isolate. Substitution of defatted soybean flour for the isolate or concentrate will decrease fat separation, but the level required for the reduction in fat separation results in a material increase in product consistency with development of a mushy, grainy product with undesirable characteristics, and thus is not preferred.

We have discovered that by the addition to these foods of from about 0.1% by weight to about 1.0% by weight of refined soybean phosphatide together with soy protein or textured soy protein or both the meat fat is emulsified and stabilized to a degree far above a level heretofore experienced or expected in the food industry. The total addition of soybean products will range from about 0.5% by weight to about 20% by weight of the meat food depending upon the fat content and fluidity or flowability of the meat food product. A proper application of the method of this invention will not materially alter the food in which the fat is stabilized; and hence, the application of the invention should have a minimal effect on consumer acceptance insofar as consistency, texture and mouth feel are concerned, and appeal for the meat foods of the invention should be enhanced through the diminution of fat separation.

The refined soybean phosphatide of this invention is derived from the processing of soybeans. During the solvent defatting of soybean to product soybean oil, crude soybean lecithin is separated during the oil degumming process. Crude soybean lecithin, produced by drying the wet gums, is a mixture of phosphorous-containing lipids, other minor components, and soybean oil. In refining crude soybean lecithin, which may contain from 50% to about 72% of acetone insolubles (AI) (American Oil Chemist's Society Official Method, Ja-4-46), the AI content is raised to from about 90% to about 95%. This refined product is that which is referred to herein as "refined soybean phosphatide". Thus crude soybean lecithin includes refined soybean phosphatide, but the term "refined soybean phosphatide" excludes crude lecithin. The exact process for producing these refined phosphatides is not disclosed herein and is not part of this invention. Refined soybean phosphatide may be granular or powdered waxy solids with a cream to tan color. Refined soybean phosphatides are marketed by the Central Soya Company under the Registered Trademark "CENTROLEX", similar products are available from other manufacturers.

Crude lecithin (the product derived from the initial separation stage from soybean oil and containing from 50% to about 72% AI) is not the preferred source of soybean phosphatide in the practice of this invention. Crude lecithin contains from about 30% by weight to about 50% by weight fluid fat. The presence of this fluid fat results in adding fat to the meat foods to which the additives of this invention are added, thereby compounding the problem to which this invention is directed. In addition, crude lecithin is also deleterious to the flavor of the product.

The soy protein isolates useful in this invention are products derived by the aqueous extraction of defatted soybean flakes or flour, and contain a minimum of 90% by weight protein ($N \times 6.25$) on a moisture-free basis. The basic process consists of extracting the source material with an aqueous, alkaline solution of varying pH, separation of the spent flakes, and precipitation of the protein in the clarified liquor with alkali. The protein curd is then separated, washed with water, neutralized with acid and spray dried. In commercial practice, various additional operations and treatments are introduced to alter the physical-chemical properties of the finished product. Again, the process by which soy protein isolates are derived is not disclosed in detail herein, nor is the process a part of this invention.

The properties of the particular soybean protein isolates useful in this invention are critical. Only those soybean protein isolates which do not materially thicken when heated in an aqueous solution of about 10% to about 15% by weight isolate at about 90° to about 100° C. for about one-half hour are useful in the practice of this invention. These isolates are generally known as the "nongelling" isolates. The words "do not materially thicken" refer to any significant increase in viscosity with the formation of stringy, clabbered, or gel structures. A description of a useful test method for determining those isolates useful in this invention may be found in the publication by Circle, Meyer and Whitney "Rheology of Soy Protein Dispersions. Effect of Heat and Other Factors On Gelations", Cereal Chemistry, 41 157-172 (1964).

Commercial soybean proteins which are typical of the products useful in this invention are the "PRO-MINE-MD" soybean protein made by Central Soya Company, Inc. and the PRO-FAM S649 soybean protein made by the Grain Processing Corporation.

The soybean protein concentrates which are useful in this invention are defined as products containing a minimum of 70% by weight protein (N×6.25) on a moisture-free basis. They are prepared from defatted soybean source material. The concentrates are prepared by leaching processes wherein the major protein fraction is immobilized and the soluble constituents are removed by the leaching solvent. A number of processes have been described in the periodical and patent literature, yet major emphasis is given to three basic processes which differ as to the leaching solvent. In one process, the solvent is 60-80% by weight aqueous alcohol; in another, the solvent, water, is acidified to a pH of about 4.5. In a third process the solvent is water; however in this process, the protein of the source material is immobilized through moist-heat denaturation. The leached solvent-wet residues are desolventized and dried by various methods. In the acidified water process, the wet material is customarily neutralized with an alkaline agent and spray dried. All concentrates useful in this invention are finely divided powders of varying protein solubility. Again, the processes for preparing soybean protein concentrate are not specifically disclosed herein and are not part of this invention.

The commercially available soy protein concentrates which are useful in this invention include "PROMO-SOY"-100 soy protein manufactured by the Central Soya Company and "GL-301" and "PROMAX" soy protein manufactured by the Griffith Laboratories.

The textured soy protein products which are useful in the practice of the invention include those produced by the familiar extrusion, compaction and steam texturing processes well known to the industry. However, the textured products useful in this invention are not limited to those products. Textured defatted soybean flour, textured soybean protein concentrate and textured soybean protein isolate all are useful in this invention. The choice of textured soybean products to be used in the practice of this invention will be governed by the particular meat food with which the invention is to be practiced and the economic considerations related to the specific product quality desired.

Textured soybean protein products are produced in a variety of sizes and shapes. This presents no problem in the practice of this invention since the physical nature of the particulate meat and/or other ingredients in the meat-in-sauce or meat-in-gravy or meat filling foods of the invention governs the choice of size and shape.

In practicing the method of the invention, meat, either ground and/or chunk, is placed in a heated kettle, or the like, and browned or braised until the meat fat which is separated from the meat is liquified. The refined soybean phosphatides are fat soluble. Thus, the refined soybean phosphatide is preferably added after the fat is liquified and combined with the liquified meat fat. In a specific embodiment, a uniform mixture of meat fat and phosphatide will result at elevated temperatures and/or at room temperature.

In other specific embodiments, the refined soybean phosphatide is dissolved in the liquid meat fat. Most of the other ingredients of the cooked meat-containing food and water are added at this time, while the heating process continues. The soybean protein product is added after the addition of the water because of its water affinity. The combination of the water and the soybean protein product can be formulated either prior to the addition or after the addition. In a specific embodiment, the soy protein product is dissolved in the water. The textured soy protein product is added after all of the ingredients have been added prior to final cooking. After final cooking, the resulting meat-in-sauce or meat-in-gravy or meat filling food is ready for packaging or dispensing.

To achieve the benefits of this invention in controlling fat separation in cooked meat-in-sauce or meat-in-gravy or meat filling foods, the addition of soybean phosphatide and one other soybean protein product or textured soybean protein product is required. Because of the fiber content of the soybean protein concentrates which result in a particulate nature when wet, these products are more useful in the low fluidity meat-in-sauce and meat-in-gravy and meat filling foods having the lower moisture contents and higher solids contents.

In the practice of the invention, both the amount of soybean phosphatide, soybean protein product and textured soybean protein products and the relative amounts of these products to each other are critical. The ingredients of the invention which are useful in emulsifying and stabilizing fat in meat-in-sauce and meat-in-gravy and meat filling foods having significant amounts of meat fat and water in accordance with the invention have from about one part by weight to about ten parts by weight of refined soybean phosphatide and from about five parts by weight to about fifty parts by weight soybean protein product or about five parts by weight to about one hundred fifty parts by weight of textured soybean protein product or about five parts by weight to about fifty parts by weight soybean protein product and five parts by weight to about one hundred fifty parts by weight of textured soybean protein. The soybean protein product is chosen from the group consisting of soybean protein isolates and soybean protein concentrates and combinations thereof. The textured soybean protein product is chosen from the group consisting of textured soybean isolates and textured soybean protein concentrates and textured defatted soybean flour and combinations thereof.

Similarly, the resulting cooked meat-containing foods resulting from the invention are comprised of meat, meat fat from about 5% by weight to about 30% by weight of the food, moisture from about 40% by weight to about 90% by weight of the food, refined soybean phosphatide from about 0.1% by weight to about 1.0% by weight of the food, and soybean protein from about 0.5% by weight to about 5.0% by weight of the food or textured soybean protein product from about 0.5% by weight to about 15.0% by weight of the food or soybean protein product from about 0.5% by weight to about 5.0% by weight and textured soybean protein product from about 0.5% by weight to about 15.5% by weight of the food. Again, the soybean protein product is chosen from the group consisting of soybean protein isolates and soybean protein concentrates and combinations thereof and the textured soybean protein product is chosen from the group consisting of textured soybean protein isolates and textured soybean protein concentrates and textured defatted soybean flour and combinations thereof.

In a specific meat-in-sauce, meat-in-gravy and meat filling food embodiments incorporating the additives of the invention in which the meat fat is emulsified and stabilized in accordance with the method of the invention containing meat fat in an amount of about 3% by weight to about 12% by weight of the food, the food contains soybean phosphatide from about 0.2% by weight to about 0.25% by weight of the food and soybean protein product from about 1.5% by weight to about 2.5% by weight of the food. Similarly, in other specific embodiments wherein the meat-in-sauce, meat-in-gravy and meat filler foods in which the meat fat is emulsified and stabilized in accordance with the method of the invention and which contain meat fat from about 12% by weight to about 18% by weight of said food, the food contains soybean phosphatides from about 0.3% by weight to about 0.35% by weight of the food and soybean protein product from about 3.0% by weight to about 4.0% by weight of the food.

In performing the method of the invention in the manner above described on meat-in-sauce, meat-in-gravy and meat filling foods having significant amounts of meat fat and water therein, the method has been found to include combining the meat fat thereof and an amount of a refined soybean phosphatide ranging from about 0.5% by weight to about 3.5% by weight of the meat fat to form a meat fat combination, combining the water and an amount of soybean protein product ranging from about 2.5% by weight to about 30% by weight of the meat fat or adding to the meat fat-water combination textured soybean protein product in an amount from about 2.5% by weight to about 35% by weight of said meat fat or combining the water and amount of soybean protein product ranging from about 2.5% by weight to about 30% by weight of the meat fat and adding textured soybean protein product in an amount from about 2.5% by weight to about 35% by weight of said meat fat. The higher amounts of textured soybean protein product are used in the meat-in-sauce and meat-in-gravy and meat filling foods which have the higher solid contents.

The following examples are presented herein to more fully illustrate the present invention. While specific refined soybean phosphatide, soybean protein, and textured soybean protein materials are used in these examples, it should be understood that a great variety of other commercially available refined soybean phosphatide, soybean protein and textured soybean protein materials can be used in the ingredients and method of the invention.

"CENTROLEX" and "PROMINE" and "RESPONSE" are all registered trademarks of Central Soya Company, Inc.

Also, it should be understood that the choice of the particular soybean protein and textured soybean protein materials and the amount used in each meat-containing food and in the performance of the method of the invention vary not only with regard to the amount of meat fat in the food but also with regard to the amount of moisture and the particular food to which the additives are to be added. For example, in foods containing a high solids content, the level of textured soybean protein materials may be higher than with regard to foods having a lower solids content. Additionally, soybean protein concentrates are more suitable for foods having lower moisture content and higher solids content than foods having higher moisture content and lower solids content. Further, each manufacturer of a particular food, for example chili, will have specific specifications related to product quality and individual product identification. Variations in the additives and method of the invention dealing with product quality and specific product identification are well known to those skilled in the art, and thus, are well within the scope of this invention.

Each of the following examples are intended to be illustrative of the invention and are not intended to limit the scope of the invention in any way whatsoever.

EXAMPLES I-VIII

The ingredients of the invention were added into identical mixtures of meat fat and water in accordance with the method of the invention to illustrate the effectiveness of the invention in stabilizing and emulsifying the meat fat in meat-in-sauce and meat-in-gravy and meat filling foods. In each of the examples, meat fat and water were placed in No. 1 short cans and heated to about 180° F. Then, in accordance with the method of the invention, CENTROLEX F refined soybean phosphatide and PROMINE MD soybean protein isolate and/or RESPONSE textured soy protein concentrate (code 4402), as produced by the Central Soya Company, were added to the beef fat and water mixtures. In those examples in which all three additives were used, CENTROLEX F was first added, the PROMINE MD was second added and the RESPONSE was last added. In those examples in which only two of the additives of the invention were added, the CENTROLEX F was always added first. After each additive was added, the beef fat and water combination was mixed until the fluid portion thereof appeared homogeneous. The cans were then sealed. In each example, two identical No. 1 short cans were sealed. One can was retorted at about 255° F. for about 55 minutes and refrigerated. The other can was refrigerated without retorting.

After about twenty four hours, the fat separation was measured. This measurement was made by opening the can and scraping off all visible surface fat. The can and its contents were weighed before and after the fat was scraped from the contents. From the difference in weights, the percentage of fat separation and the percentage of fat emulsified and stabilized were calculated.

The specific formulation of each example is shown in Table I. The results are shown in Table II. Examples I-VIII are a rigorous test of the effectiveness of the invention, in that each formulation includes only beef fat and water.

TABLE I

| EXAMPLE | All weights in grams | | | | | | | |
|---|---|---|---|---|---|---|---|---|
|  | I | II | III | IV | V | VI | VII | VIII |
| Beef Fat | 60.0 | 60.0 | 60.0 | 60.0 | 60.0 | 60.0 | 60.0 | 60.0 |
| Water | 100.0 | 100.0 | 100.0 | 100.0 | 100.0 | 100.0 | 100.0 | 100.0 |
| CENTROLEX F[a] | — | 1.0 | — | — | 1.0 | 1.0 | — | 1.0 |
| PROMINE MD[b] | — | — | 5.0 | — | 5.0 | — | 5.0 | 5.0 |
| RESPONSE[c] | — | — | — | 4.6 | — | 4.6 | 4.6 | 4.6 |

[a]Refined soybean phosphatide produced by Central Soya Company, Inc.
[b]Soy protein isolate produced by Central Soya Company, Inc.
[c]Textured soy protein concentrate (Code 4402) produced by Central Soya Company, Inc.

TABLE II

| FORMULATION | TREATMENT | WGT. SEP. FAT | PERCENT FAT STABILIZED |
|---|---|---|---|
| Example I | Retort | 59.76 | 0.40 |
|  | Refrig. | 60.23 | 0.00 |
| Example II | Retort | 59.05 | 1.58 |
|  | Refrig. | 56.52 | 5.80 |
| Example III | Retort | 59.58 | 0.70 |
|  | Refrig. | 57.30 | 4.50 |
| Example IV | Retort | 59.87 | 0.22 |
|  | Refrig. | 60.08 | 0.00 |
| Example V | Retort | 44.23 | 26.28 |
|  | Refrig. | 34.72 | 42.13 |
| Example VI | Retort | 56.69 | 5.52 |
|  | Refrig. | 46.43 | 22.62 |
| Example VII | Retort | 59.85 | 0.25 |
|  | Refrig. | 58.41 | 2.65 |
| Example VIII | Retort | 38.78 | 35.37 |
|  | Refrig. | 30.72 | 48.80 |

The results of Examples I–VIII dramatically illustrate the synergistic effect of the addition of the ingredients of the invention to meat-containing foods. A significant synergistic effect is shown upon the addition of refined soybean phosphatide, soy protein and textured soy protein, as well as the addition of refined soybean phosphatide and soy protein and refined soybean phosphatide and textured soy protein.

Actual food formulations demonstrate better meat fat stabilization and emulsification in actual meat-containing foods and the effect of the invention, if any, by the multiple food ingredients contained in these foods.

Thus, Examples IX–XVI follow. These examples relate to commercially realistic formulations; and thus indicate the practical value of the invention disclosed herein.

EXAMPLE IX

Two batches of chili con carne, no beans, were made. The first batch consisted of the following ingredients and was made in accordance with the following processing procedure:

| INGREDIENTS | % |
|---|---|
| Lean Beef Trimmings (45% fat) | 42.00 |
| Water | 37.75 |
| Wheat Flour | 4.00 |
| Chili Powder | 3.25 |
| Salt | 1.25 |
| Tomato Paste | 7.50 |
| Sugar | 0.25 |
| Modified Food Starch | 1.00 |
| Textured Soy Protein Concentrate | 3.00 |
|  | 100.00 |

PROCESSING PROCEDURE

1. Grind meat through ⅜" plate.
2. Place meat in kettle, brown until fat is liquified.
3. Add chili powder, salt, sugar, mix well.
4. Slurry wheat flour in minimal amount of cold water. Hold until later.
5. Add remaining water to kettle.
6. Add caramel color and tomato paste, mix well.
7. Add RESPONSE Textured Soy Protein Concentrate, mix well.
8. Add wheat flour slurry.
9. Heat to 180° F., hold for 10 minutes.
10. The product is then canned, retorted at 255° F. for 55 minutes, and then refrigerated.

The second batch of chili con carne, no beans, was made utilizing the same formulation and processing conditions with the following exceptions. 0.3% by weight of CENTROLEX F refined soybean phosphatide was added to the liquified meat fat after Step 2. 3.0% by weight of PROMINE MD soybean protein isolate was added to the mixture after Step 5.

The amount of meat fat in both batches was determined. The batch without the ingredients contained 18.9% by weight meat fat, the batch with the ingredients contained 18.3% by weight meat fat.

After refrigeration, the cans of both batches were weighed, and then opened. All visible surface fat was carefully scraped off the contents, and the container and remaining contents were again weighed. From the difference in weights, the percentage of fat separation and the percentage of fat emulsified and stabilized was calculated. The batch without the ingredients of the invention was determined to have about 85% fat separation. The batch with the ingredients of the invention was determined to have only about 5% fat separated.

EXAMPLE X

Two batches of chili con carne, with beans, were made. The first batch consisted of the following ingredients and was made in accordance with the following processing procedure:

| INGREDIENTS | % |
|---|---|
| Beef Trimmings (50% Fat) | 27.00 |
| Water | 22.90 |
| Tomato Paste | 9.00 |
| Chili Powder | 2.00 |
| Modified Food Starch | 2.20 |
| Wheat Flour | 5.00 |
| Textured Soy Protein Concentrate | 1.90 |
| Kidney Beans, cooked | 30.00 |
|  | 100.00 |

PROCESSING PROCEDURE

1. Place kidney beans in boiling water, cook to 50% moisture.
2. Grind beef trimmings through ¼" plate.
3. Place ground beef in kettle, brown until fat is liquified.
4. Add chili powder, mix well.
5. Slurry starch in a minimal amount of cold water. Hold until later.
6. Add remaining water to kettle.
7. Add tomato puree.
8. Add RESPONSE Textured Soy Protein Concentrate, mix well.
9. Add starch slurry.
10. Add cooked beans, heat to 180° F., hold for 10 minutes.
11. The product is then canned, retorted at 255° F. for 55 minutes, and then refrigerated.

The second batch of chili con carne, with beans, was made utilizing the same formulation and processing conditions with the following exceptions. 0.2% by weight of CENTROLEX F refined soybean phosphatide was added to the liquified meat fat after Step 3. 2.0% by weight of PROMINE MD soybean protein isolate was added to the mixture after Step 6.

The amount of meat fat in both batches was determined. The batch without the ingredients contained 13.5% by weight meat fat, the batch with the ingredients contained 13.2% by weight meat fat.

After refrigeration, the cans of both batches were weighed, and then opened. All visible surface fat was carefully scraped off the contents, and the container and remaining contents were again weighed. From the difference in weights, the percentage of fat separation and the percentage of fat emulsified and stabilized was calculated. The batch without the ingredients was determined to have about 80% fat separation. The batch with the ingredients of the invention showed practically no fat separation.

EXAMPLE XI

Two batches of sloppy joe were made. The first batch consisted of the following ingredients and was made in accordance with the following processing procedure:

| INGREDIENTS | % |
|---|---|
| Beef (60% fat) | 37.00 |
| Water | 32.60 |
| Tomato Puree | 22.00 |
| Onions, dehydrated, minced | 1.00 |
| Salt | 0.70 |
| Brown Sugar | 0.60 |
| Wheat Flour | 2.00 |
| Modified Food Starch | 1.00 |
| Spices | 0.50 |
| Textured Soy Flour | 2.60 |
| | 100.00 |

PROCESSING PROCEDURE

1. Grind meat through ⅜" plate.
2. Place meat and dehydrated onions in kettle, brown until fat is liquified.
3. Add spices, salt, and brown sugar, mix well.
4. Slurry wheat flour in a minimal amount of cold water. Hold until later.
5. Add remaining water to kettle.
6. Add tomato puree to kettle, mix well.
7. Add Textured Soy Flour, mix well.
8. Add wheat flour slurry.
9. Heat to 180° F., hold for 10 minutes.
10. The product is then canned, retorted at 255° F. for 55 minutes, and then refrigerated.

The second batch of sloppy joe was made utilizing the same formulation and processing conditions with the following exceptions. 0.4% by weight of CENTROLEX F refined soybean phosphatide was added to the liquified meat fat after Step 2. 4.0% by weight of PROMINE MD soybean protein isolate was added to the mixture after Step 5.

The amount of meat fat in both batches was determined. The batch without the ingredients of the invention contained 22.2% by weight meat fat, the batch with the ingredients of the invention contained 21.3% by weight meat fat.

After refrigeration, the cans of both batches were weighed, and then opened. All visible surface fat was carefully scraped off the contents, and the container and remaining contents were again weighed. From the difference in weights, the percentage of fat separation and the percentage of fat emulsified and stabilized was calculated. The batch without the ingredients was determined to have about 75% fat separation. The batch with the ingredients of the invention was determined to have only about 5% to 10% fat separated.

EXAMPLE XII

The batches of beef taco filling were made. The first batch consisted of the following ingredients and was made in accordance with the following processing procedure:

| INGREDIENTS | % |
|---|---|
| Beef (35% fat) | 43.00 |
| Refried Pinto Beans | 25.00 |
| Water | 17.00 |
| Tomato Paste | 8.00 |
| Spice Blend | 2.00 |
| Wheat Flour | 5.00 |
| | 100.00 |

PROCESSING PROCEDURE

1. Braise ground beef in kettle, brown until fat is liquified.
2. Add water, mix well.
3. Add spice blend, salt, monosodium glutamate, and tomato paste, mix well.
4. Add refried pinto beans, mix well.
5. Heat product to 180° F., hold for 10 minutes.
6. The product is then canned, retorted at 255° F. for 55 minutes, and then refrigerated.

The second batch of beef taco filling was made utilizing the same formulation and processing conditions with the following exceptions. 0.2% by weight of CENTROLEX F refined soybean phosphatide was added to the liquified meat fat after Step 1. 2.5% by weight of PROMINE MD soybean protein isolate was added to the mixture after Step 2.

The amount of meat fat in both batches was determined. The batch without the ingredients of the invention contained 15.1% by weight meat fat, the batch with the ingredients of the invention contained 14.2% by weight meat fat.

After refrigeration, the cans of both batches were weighed, and then opened. All visible surface fat was carefully scraped off the contents, and the container and remaining contents were again weighed. From the difference in weights, the percentage of fat separation and the percentage of fat emulsified and stabilized was calculated. The batch without the ingredients of the invention was determined to have about 60% fat separation. The batch with the ingredients of the invention was determined to have only about 5% fat separated.

EXAMPLE XIII

Two batches of spaghetti sauce with meat were made. The first batch consisted of the following ingredients and was made in accordance with the following processing procedure:

| INGREDIENTS | % |
|---|---|
| Beef (50% fat) | 7.00 |
| Water | 46.30 |
| Tomato Paste | 20.00 |
| Tomato Sauce | 22.00 |
| Salt | 0.70 |
| Dextrose | 0.50 |
| Spices | 1.50 |
| Modified Food Starch | 1.00 |
| Wheat Flour | 1.00 |
| | 100.00 |

PROCESSING PROCEDURE

1. Grind beef through 3/16" plate.
2. Add ground beef to kettle, brown until fat is liquified.
3. Slurry starch in a minimal amount of cold water.
4. Add remaining water to kettle.
5. Add tomato paste, tomato sauce, salt, dextrose, and spices, mix well.
6. Add starch slurry, mix well, heat to 180° F., and hold for 10 minutes.
7. The product is then canned, retorted at 255° F. for 55 minutes, and then refrigerated.

The second batch of spaghetti sauce with meat, was made utilizing the same formulation and processing conditions with the following exceptions. 0.1% by weight of CENTROLEX F refried soybean phosphatide was added to the liquified meat fat after Step 2. 0.5% by weight of PROMINE MD soybean protein isolate was added to the mixture after Step. 4. 0.45% by weight of textured soybean protein concentrate was added after Step 5.

The amount of meat fat in both batches was determined to be 3.5% by weight meat fat.

After refrigeration, the cans of both batches were weighed, and then opened. All visible surface fat was carefully scraped off the contents, and the container and remaining contents were again weighed. From the difference in weights, the percentage of fat separation and the percentage of fat emulsified and stabilized was calculated. The batch without the ingredients was determined to have about 90% fat separation. The batch with the ingredients of the invention was determined to have no fat separated.

EXAMPLE XIV

Two batches of beef stew were made. The first batch consisted of the following ingredients and was made in accordance with the following processing procedure:

| INGREDIENTS | % |
|---|---|
| Beef (1" cubes) (10% fat) | 15.00 |
| Beef (50% fat) | 12.00 |
| Mixed Vegetables | 14.00 |
| Potatoes (½" cubes) | 16.00 |
| Water | 37.10 |
| Tomato Paste | 2.00 |
| Modified Food Starch | 2.00 |
| Onions, dehydrated, minced | 0.70 |
| Salt | 0.70 |
| Spices | 0.50 |
| | 100.00 |

PROCESSING PROCEDURE

1. Grind beef (50% fat) through 3/16" plate.
2. Place ground beef, beef cubes, and dehydrated onions in kettle, brown until fat is liquified.
3. Add spices and salt, mix well.
4. Slurry starch in a minimal amount of cold water. Hold until later.
5. Add remaining water.
6. Add tomato paste, mix well.
7. Add mixed vegetables and potatoes, mix well.
8. Add starch slurry. Heat to 180° F., hold for 10 minutes.
9. Dispense mixture into aluminum trays, seal, and quick freeze.

The second batch of beef stew was made utilizing the same formulation and processing conditions with the following exceptions. 0.15% by weight of CENTROLEX F refined soybean phosphatide was added to the liquified meat fat after Step 2. 1.5% by weight of PROMINE MD soybean protein isolate and 1.5% by weight textured soybean protein concentrate were added to the mixture after Step 5.

The amount of meat fat in both batches was determined. The batch without the ingredients of the invention contained 7.5% by weight meat fat, the batch with the ingredients of the invention contained 7.3% by weight meat fat.

After refrigeration, the cans of both batches were weighed, and then opened. All visible surface fat was carefully scraped off the contents, and the container and remaining contents were again weighed. From the difference in weights, the percentage of fat separation and the percentage of fat emulsified and stabilized was calculated. The batch without the ingredients of the invention was determined to have about 40% fat separation. The batch with the ingredients of the invention was determined to have only about 10% fat separated.

EXAMPLE XV

Two batches of beef and barley soup were made. The first formulation consisted of the following ingredients and was made in accordance with the following processing procedure:

| INGREDIENTS | % |
|---|---|
| Beef (50% fat) | 10.00 |
| Water | 61.25 |
| Barley (quick cooking or completely cooked) | 15.00 |
| Hydrolyzed Vegetable Protein | 5.00 |
| Monosodium Glutamate | 2.00 |
| Salt | 1.00 |
| Spices | 3.00 |
| Dextrose | 2.00 |
| Wheat Flour | 0.75 |
| | 100.00 |

PROCESSING PROCEDURE

1. Place barley in boiling water, cook to 50% moisture.
2. Grind beef through 3/16" plate.
3. Place ground beef and ½ water in kettle, cook until fat is liquified.
4. Add spices, hydrolyzed vegetable protein, monosodium glutamate, salt, and dextrose, mix well.
5. Add remaining water.
6. Add cooked barley, mix well.
7. Heat to 180° F., hold for 10 minutes.
8. The product is then canned, retorted at 255° F. for 55 minutes, and then refrigerated.

The second batch of beef and barley soup was made utilizing the same formulation and processing conditions with the following exceptions. 0.1% by weight of CENTROLEX F refined soybean phosphatide was added to the liquified meat fat after Step 3. 0.5% by weight of PROMINE MD soybean protein isolate was added to the mixture after Step 5.

The amount of meat fat in both batches was determined. The batch without the ingredients of the invention contained 5.0% by weight meat fat, the batch with the ingredients of the invention contained a little less than 5.0% by weight meat fat.

After refrigeration, the cans of both batches were weighed, and then opened. All visible surface fat was carefully scraped off the contents, and the container and remaining contents were again weighed. From the difference in weights, the percentage of fat separation and the percentage of fat emulsified and stabilized was calculated. The batch without the ingredients of the invention was determined to have about 90% fat separation. The batch with the ingredients of the invention was determined to have only a trace of fat separation.

EXAMPLE XVI

Two batches of beef, bean and green chili burrito filling were made. The first formulation consisted of the following ingredients and was made in accordance with the following processing procedure:

| INGREDIENTS | % |
|---|---|
| Beef (50% fat) | 20.00 |
| Water | 35.00 |
| Refried Pinto Beans | 15.00 |
| Tomato Puree | 8.00 |
| Green Chile | 5.00 |
| Wheat Flour | 3.00 |
| Spices | 4.00 |
| | 100.00 |

PROCESSING PROCEDURE

1. Braise ground beef in kettle, brown until fat is liquified.
2. Add water, mix well.
3. Add tomato puree, green chile, wheat flour and spices, mix well.
4. Add refried pinto beans, mix well.
5. Heat product to 180° F., hold for 10 minutes.
6. Place in aluminum trays, seal and quick freeze.

The second batch of beef, bean and green chili burrito filling was made utilizing the same formulation and processing conditions with the following exceptions:

0.3% by weight of CENTROLEX F refined soybean phosphatide was added to the liquified meat fat after Step 1. 2.3% by weight of textured soybean flour isolate was added to the mixture after Step 2.

The amount of meat fat in both batches was determined. The batch without the ingredients of the invention contained 15.0% by weight meat fat, the batch with the ingredients of the invention contained 14.1% by weight meat fat.

After refrigeration, the cans of both batches were weighed, and then opened. All visible surface fat was carefully scraped off the contents, and the container and remaining contents were again weighed. From the difference in weights, the percentage of fat separation and the percentage of fat emulsified and stabilized was calculated. The batch without the ingredients of the invention was determined to have about 60% fat separation. The batch with the ingredients of the invention was determined to have only about 10% fat separated.

While there have been described above the principles of this invention in connection with specific apparatus, it is to be clearly understood that this description is made only by way of example and not as a limitation to the scope of the invention.

We claim:

1. In a method of emulsifying and stabilizing fat in meat-in-sauce, meat-in-gravy and meat filling foods having significant amounts of meat, said meat having water and from about 5% to about 30% meat fat associated therewith, the steps comprising:
    a. heating the meat to liquefy the meat fat,
    b. adding to the meat and liquefied meat fat, from about 0.5% to about 3.5%, by weight of the meat fat, of a refined soybean phosphatide to form a meat fat-soybean phosphatide combination,
    c. adding water to the meat fat-soybean phosphatide combination;
    d. thereafter adding a soybean protein product selected from the class consisting of soybean protein isolates, soybean protein concentrates, textured soybean isolates, textured soybean concentrates, textured defatted soybean flour and combinations thereof, said soybean protein product, when added in the form of a soybean protein isolate or concentrate, being in an amount of from about 2.5% to about 30% by weight of said meat fat, and said soybean protein product, when added in textured form, being in an amount of from about 2.5% to about 35% by weight of said meat fat, and then
    e. heating the resulting mixture for at least about 10 minutes at 180° F.

2. The method of claim 1 in which said resulting heated mixture is thereafter dispensed into aluminum trays, sealed and quick frozen.

3. The method of claim 2 in which said resulting mixture contains beef cubes for providing a beef stew.

4. The method of claim 2 in which said resulting mixture contains ground beef for providing a beef burrito.

5. The method of claim 1 in which said resulting heated mixture is thereafter canned, retorted at 255° F. for 55 minutes and then refrigerated.

6. The method of claim 1 in which said soybean phosphatide is present in an amount of 1–10 parts by weight said soybean protein product, when an isolate or concentrate, is present in an amount of 5–50 parts by weight, and said soybean protein product, when textured, is present in an amount of 5–150 parts by weight.

7. A method for preparing meat-in-sauce, meat-in-gravy, and meat filling foods comprising heating meat, having a fat content of from about 5% to about 30%, to liquefy said fat, adding a refined soybean phosphatide to the meat-liquefied fat mixture in an amount from about 0.5% to about 3.5% by weight of said fat, thereafter adding water under conditions of mixing, and thereafter adding a soybean protein product selected from the class consisting of an untextured soybean protein isolate, an untextured soybean protein concentrate, a textured soybean protein isolate, a textured soybean protein concentrate, a textured defatted soybean flour and combinations thereof, said soybean protein product, when untextured, being added in an amount of from about 5% to about 30% of said fat, and when textured, in an amount of from about 5% to about 35% of said fat, heating the resulting mixture for at least 10 minutes at 180° F., and then cooling the same whereby fat separation is minimized.

8. In a method of emulsifying and stabilizing fat in meat-in-sauce, meat-in-gravy and meat filling foods having significant amounts of meat, said meat having water and from about 5% to about 30% meat fat associated therewith, the steps comprising:
    a. heating the meat to liquefy the meat fat, b. adding to the meat and liquefied meat fat, from about 0.5% to about 3.5% by weight of the meat fat, of a refined soybean phosphatide to form a meat fat-soybean phosphatide combination,
c. adding water and a soybean protein product to the meat fat-soybean phosphatide combination, the soybean product being selected from the class consisting of soybean protein isolates, soybean protein concentrates, textured soybean isolates, textured soybean concentrates, textured defatted soybean flour and combinations thereof, said soybean protein product, when added in the form of a soybean protein isolate or concentrate, being in an amount of from about 2.5% to about 30% by weight of said meat fat, and said soybean protein product, when added in textured form, being in an amount of from about 2.5% to about 35% by weight of said meat fat, and then
d. heating the resulting mixture for at least about 10 minutes at 180° F.

* * * * *